(12) United States Patent
Yoshizaki

(10) Patent No.: US 11,338,732 B1
(45) Date of Patent: May 24, 2022

(54) HITCH CROSS PATH ALERT SYSTEMS

(71) Applicant: Toyota Motor Engineering & Manufacturing North America, Inc., Plano, TX (US)

(72) Inventor: Coh L. Yoshizaki, Wixom, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/245,621

(22) Filed: Apr. 30, 2021

(51) Int. Cl.
*B60Q 5/00* (2006.01)
*B60Q 9/00* (2006.01)
*B60D 1/58* (2006.01)
*B60Q 1/52* (2006.01)

(52) U.S. Cl.
CPC ............ *B60Q 5/006* (2013.01); *B60Q 1/525* (2013.01); *B60Q 9/008* (2013.01); *B60D 1/58* (2013.01)

(58) Field of Classification Search
None
See application file for complete search history.

(56) References Cited

U.S. PATENT DOCUMENTS

| | | | |
|---|---|---|---|
| 4,593,264 A | 6/1986 | Engle | |
| 5,037,122 A * | 8/1991 | Beckerer, Jr. | B60D 1/605 280/507 |
| 5,861,814 A * | 1/1999 | Clayton | B60D 1/36 340/687 |
| 6,527,292 B2 * | 3/2003 | Adair | B60D 1/54 280/491.3 |
| 7,237,790 B2 | 7/2007 | Gehring et al. | |
| 9,550,399 B2 | 1/2017 | Jones et al. | |
| 10,239,416 B2 | 3/2019 | Zenner et al. | |
| 2005/0151631 A1 * | 7/2005 | Honan, III | B60D 1/36 340/431 |
| 2006/0244635 A1 * | 11/2006 | Chavarria | G08G 1/162 340/944 |
| 2008/0046150 A1 * | 2/2008 | Breed | B60R 21/0134 701/45 |
| 2012/0182140 A1 * | 7/2012 | Kumabe | G08G 1/161 340/435 |
| 2012/0326917 A1 * | 12/2012 | Kiehne | B60T 7/22 342/71 |
| 2014/0300083 A1 * | 10/2014 | Barklage | B60D 1/60 280/507 |
| 2015/0091740 A1 * | 4/2015 | Bai | B60Q 9/008 340/901 |
| 2016/0272172 A1 * | 9/2016 | Lee | B60T 8/171 |
| 2016/0343256 A1 * | 11/2016 | Song | H04L 67/26 |
| 2017/0113502 A1 * | 4/2017 | Arakelian | B60D 1/06 |
| 2018/0082588 A1 * | 3/2018 | Hoffman, Jr. | G08G 1/166 |
| 2018/0215382 A1 * | 8/2018 | Gupta | G05D 1/0214 |

(Continued)

FOREIGN PATENT DOCUMENTS

WO 2014168016 A1 10/2014

*Primary Examiner* — Muhammad Adnan
(74) *Attorney, Agent, or Firm* — Dinsmore & Shohl LLP

(57) ABSTRACT

A hitch cross path alert system for a vehicle is presented. A first sensor may detect whether a hitch is connected to a hitch receiver connected to the vehicle. A second sensor may identify a pedestrian in proximity to the vehicle. A processor may be configured to predict a path of the pedestrian based on data captured by the second sensor and to cause the vehicle to output an audio or visual warning to the pedestrian.

20 Claims, 4 Drawing Sheets

(56) References Cited

U.S. PATENT DOCUMENTS

| | | |
|---|---|---|
| 2019/0241032 A1 | 8/2019 | Webster et al. |
| 2019/0335100 A1 | 10/2019 | Chen et al. |
| 2019/0340787 A1 | 11/2019 | Ramirez Llanos |
| 2020/0355563 A1 | 11/2020 | Schamer |
| 2020/0391562 A1* | 12/2020 | Abdel-Rahman ..... B60W 10/20 |
| 2021/0034902 A1 | 2/2021 | Assa et al. |

* cited by examiner

HITCH CROSS PATH ALERT SYSTEMS

TECHNICAL FIELD

The present specification generally relates to pedestrian safety and, more specifically, a hitch cross path alert systems.

BACKGROUND

A vehicle tow hitch may be used to connect a trailer or other device to a vehicle such that the vehicle may tow the trailer. A vehicle tow hitch typically extends out from the rear of a vehicle and includes a tow ball that may be coupled to a trailer to connect the trailer to the vehicle. When not in use, the tow hitch may be removed from the vehicle. However, if the tow hitch is not removed when not in use, then, when there is no trailer or other device connected to the tow ball, nearby pedestrians may not see the tow ball since it is typically positioned low to the ground. As such, a pedestrian may accidentally walk into the tow hitch or tow ball, which may cause an injury to the pedestrian.

Accordingly, a need exists for a device to alert pedestrians to the presence of a tow ball that is not connected to a trailer.

SUMMARY

In accordance with one embodiment, a hitch cross path alert system for a vehicle includes a first sensor to detect whether a tow hitch comprising a tow ball is connected to a hitch receiver connected to the vehicle, a second sensor to identify a pedestrian in proximity to the vehicle, and a processor configured to predict a path of the pedestrian based on data captured by the third sensor and to cause the vehicle to output an audio or visual warning to the pedestrian.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a system to warn pedestrians of the presence of a nearby tow hitch that is not connected to a trailer. The system may detect whether a tow hitch is connected to a vehicle. If a tow hitch is connected to a vehicle, the system may detect whether a trailer is connected to the tow hitch. If a trailer is not connected to the tow hitch, the system may identify nearby pedestrians that are approaching the tow hitch. If any pedestrians approaching the tow hitch are identified, the system may issue an audio and/or visual alert to warn the pedestrian to indicate the presence of the tow hitch.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Figure 1:
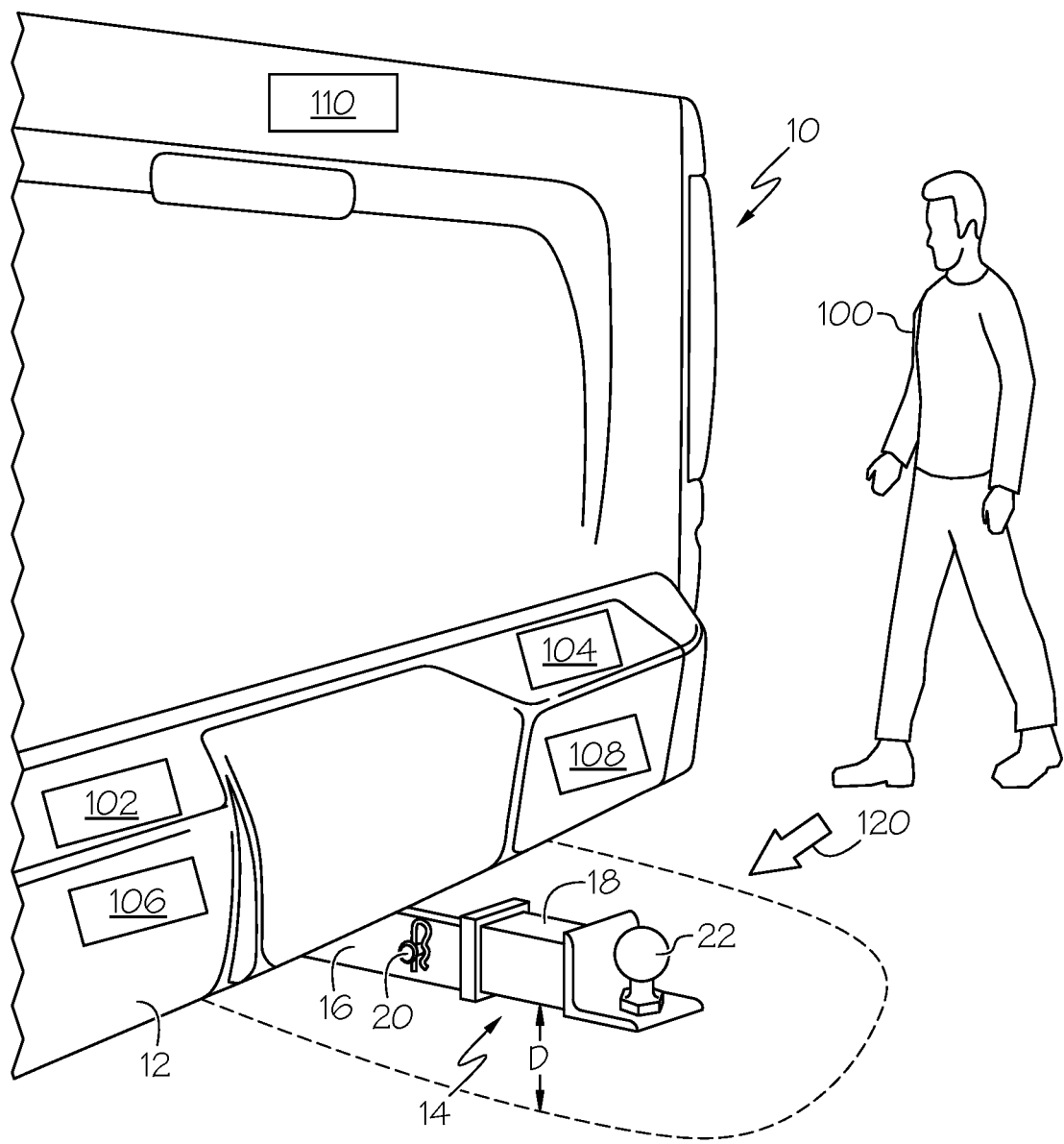
FIG. 1 schematically depicts a perspective view of a rear portion of a vehicle having a connected tow hitch and tow ball, according to one or more embodiments shown and described herein.

Referring to FIG. 1, a vehicle 10 is generally depicted. In some embodiments, the vehicle 10 is a truck, such as a pickup truck. In some other embodiments, the vehicle 10 is a car, a sports utility vehicle, a van, or other types of vehicles which are provided to tow a trailer, or attach an accessory such as a bicycle rack. The vehicle 10 includes a body component 12, and a hitch assembly 14 coupled to the body component 12. In some embodiments, the body component 12 is a rear bumper, a rear bumper reinforcement, or a rear frame of the vehicle 10. The vehicle 10 also includes sensors 102, 104, and 106, external lights 108, and external speakers 110, discussed in further detail below.

The hitch assembly 14 includes a hitch receiver 16, a hitch 18, and hitch lock assembly 20. The hitch receiver 16 is connected to the body component 12 of the vehicle 10. In some embodiments, the hitch receiver 124 is manufactured as part of the vehicle 10. In other embodiments, the hitch receiver 16 may be connected to the body component 12 of the vehicle 10 by a user after the vehicle 10 is manufactured.

An end portion of the hitch receiver 16 is configured to receive the hitch 18. As shown in FIG. 1, the hitch 18 may include a tow ball 22. It is appreciated that the hitch 18 may include a bicycle rack, an accessory mount, a hook connector, or other types of connection mechanisms that are attached to the vehicle 10 by the hitch receiver 16. A trailer may be coupled to the tow ball 22 to connect the trailer to the vehicle 10. The hitch receiver 16 may receive the hitch 18. The hitch lock assembly 20 may lock the hitch 18 in place within the hitch receiver 16.

When the hitch assembly 14 is not in use (e.g., when not connected to a trailer), the hitch 18 may be removed from the hitch receiver 16. However, if the hitch 18 is not removed from the hitch receiver 16 when not in use, the hitch 18 having the tow ball 22 may extend from the body component 12 of the vehicle 10, as shown in FIG. 1. As shown in FIG. 1, the hitch 18 may extend from the hitch receiver 16 from underneath a rear bumper of the vehicle 10. As such, the hitch 18 and the tow ball 22 may be positioned low to the ground when not connected to a trailer. Accordingly, nearby pedestrians may not readily see the hitch 18 and the tow ball 22 and may inadvertently walk into the hitch 18 or the tow ball 22 when walking behind the vehicle 10. In the example of FIG. 1, a pedestrian 100 is walking along path 120 towards the hitch 18 and the tow ball 22. Accordingly, disclosed herein is a hitch cross path alert system to alert nearby pedestrians when the hitch 18 is attached to the hitch receiver 16 and not attached to a trailer and a pedestrian is approaching the tow ball 22.

Figure 2:
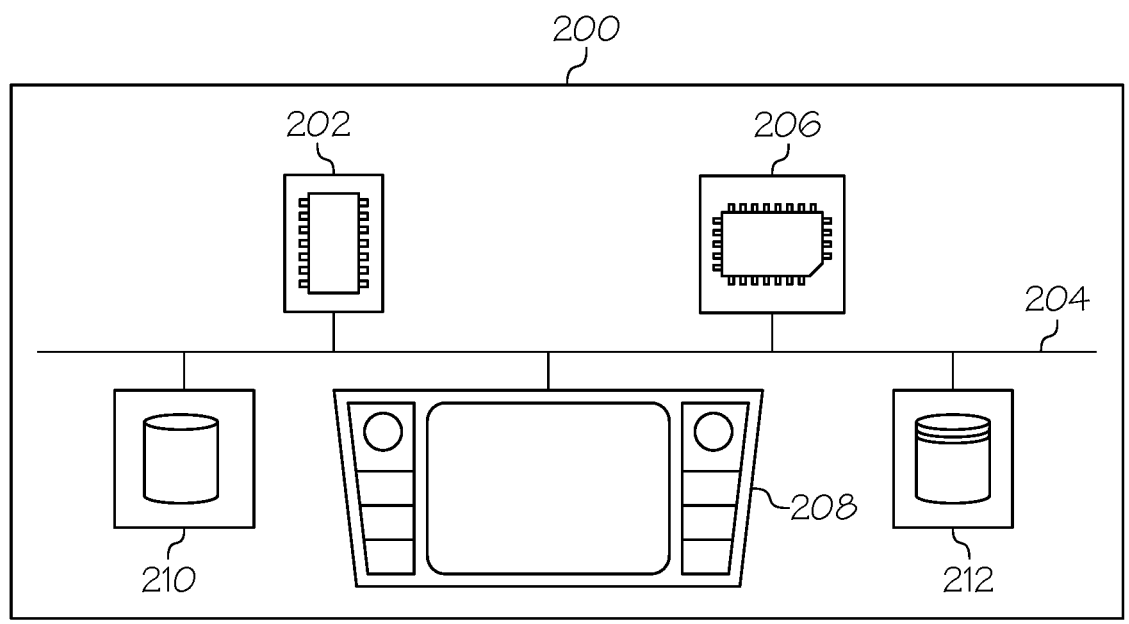
FIG. 2 depicts a schematic diagram of a hitch cross path alert system, according to one or more embodiments shown and described herein.

FIG. 2 depicts a hitch cross path alert system 200 that may be included in the vehicle 10 of FIG. 1. The hitch cross path alert system 200 includes one or more processors 202, a communication path 204, one or more memory modules 206, a display unit 208, one or more vehicle sensors 210, and a data storage component 212, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, an electronic control unit, or any other computing device. The one or more processors 202 are coupled to a communication path 204 that provides signal interconnectivity between various modules of the hitch cross path alert system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The hitch cross path alert system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the hitch cross path alert system 200 comprises the display unit 208, which may output information to a driver or other occupants of the vehicle 10. The display unit 208 may comprise a display and/or one or more speakers.

Referring still to FIG. 2, the hitch cross path alert system 200 comprises one or more vehicle sensors 210, such as the sensors 102, 104, and 106 of FIG. 1. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors (e.g., GPS modules)), and the like. In one example, the vehicle sensors 210 may include rear facing cameras, which may capture images behind the vehicle 10. The images captured by the cameras may be used to determine whether the hitch 18 is connected to the hitch receiver 16, whether a trailer is coupled to the tow ball 22, and whether any pedestrians are approaching the hitch 18, as disclosed herein. In some examples, the vehicle sensors 210 may include a switch positioned inside the hitch receiver 16 that may close when the hitch 18 is connected to the hitch receiver 16. In some examples, the vehicle sensors 210 may include a proximity sensor to detect the hitch 18 and/or the tow ball 22.

Still referring to FIG. 2, the hitch cross path alert system 200 comprises the data storage component 212, such as a database. The data storage component 212 may store data that may be utilized by the memory modules 206 and/or other components of the hitch cross path alert system 200. For example, the data storage component 212 may store data received by the one or more vehicle sensors 210.

Figure 3:
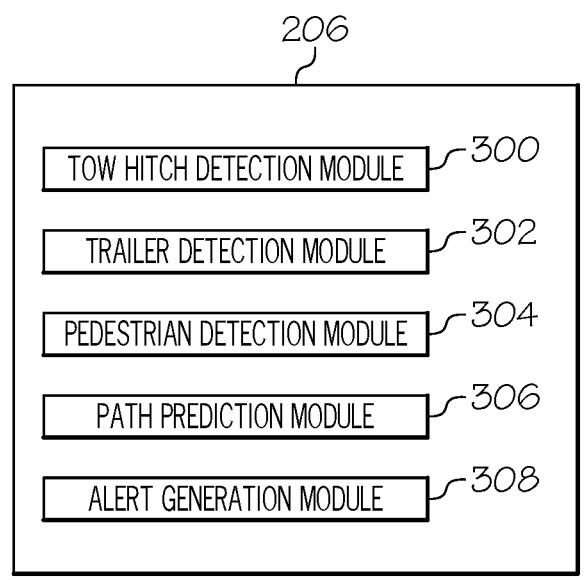
FIG. 3 depicts a schematic diagram of a plurality of memory modules that may be part of the hitch cross path alert system of FIG. 2, according to one or more embodiments shown and described herein.

Now referring to FIG. 3, exemplary memory modules 206 of the hitch cross path alert system 200 are shown. The one or more memory modules 206 include a tow hitch detection module 300, a trailer detection module 302, a pedestrian detection module 304, a path prediction module 306, and an alert generation module 308. Each of the tow hitch detection module 300, the trailer detection module 302, the pedestrian detection module 304, the path prediction module 306, and the alert generation module 308 may be a program module in the form of operating systems, application program modules, and other program modules stored in the one or more memory modules 206. Such a program module may include, but is not limited to, routines, subroutines, programs, objects, components, data structures and the like for performing specific tasks or executing specific data types as will be described below.

The tow hitch detection module 300 may determine whether the hitch 18 is connected to the hitch receiver 16. The tow hitch detection module 300 may make this determination based on data captured by the sensor 102. In one example, the sensor 102 is an optical sensor, such as a rear facing camera, and the tow hitch detection module 300 may detect the hitch 18 based on one or more images captured by the sensor 102, such as the rear facing camera. In these examples, the tow hitch detection module 300 may perform image processing techniques on such images to detect the hitch 18. For example, the tow hitch detection module 300 may identify the tow ball 22 in an image captured by a rear facing camera to determine that the hitch 18 is connected to the hitch receiver 16.

In other examples, the tow hitch detection module 300 may utilize other types of sensors to detect the hitch 18. For example, a sensor (e.g., an optical sensor or a switch) may be positioned inside the hitch receiver 16 to detect the presence of the hitch 18. Alternatively, the sensor 102 may be a proximity sensor that detects the presence of the hitch 18 or the tow ball 22. In other examples, the sensor 102 may comprise another type of sensor such as Radar, Lidar, Sonar, and the like. In embodiments, the tow hitch detection module 300 may receive a signal from the sensor 102 and may determine whether the hitch 18 is connected to the hitch receiver 16 based on the received signal.

Referring still to FIG. 3, the trailer detection module 302 may determine whether a trailer or other device is connected to the tow ball 22. The trailer detection module 302 may make this determination based on data captured by the sensor 104. In one example, the sensor 104 may comprise a rear facing camera and the trailer detection module 302 may detect a trailer connected to the tow ball 22 based on one or more images captured by the rear facing camera. In these examples, the trailer detection module 302 may perform image processing techniques on such images to detect a trailer connected to the tow ball 22.

In other examples, the sensor 104 may comprise another type of sensor to detect a trailer connected to the tow ball 22. For example, the sensor 104 may comprise a Radar, Lidar, Sonar, or other type of sensor. In some examples, the trailer detection module 302 may receive a signal from a sensor that detects a physical connection between the tow ball 22 and a trailer.

Referring still to FIG. 3, the pedestrian detection module 304 may detect a pedestrian in proximity to the vehicle 10 or the hitch 18. The pedestrian detection module 304 may detect a pedestrian based on data captured by the sensor 106. For example, the sensor 106 may comprise a camera and the pedestrian detection module 304 may detect a pedestrian based on images captured by the camera. In other examples, the sensor 106 may comprise another type of sensor such as a Radar sensor.

In embodiments, the pedestrian detection module 304 may use a classifier to identify a pedestrian in an image captured by a camera. In some examples, a classifier may use machine learning techniques and/or an artificial neural network to identify a pedestrian in an image captured by a camera. Using a classifier may allow the pedestrian detection module 304 to distinguish pedestrians from non-pedestrians. That is, a classifier may prevent the pedestrian detection module 304 from misidentifying animals, stray garbage, or other objects as pedestrians.

Referring still to FIG. 3, the path prediction module 306 may predict the path of a pedestrian detected by the pedestrian detection module 304 (e.g., the path 120 of the pedestrian 100 of FIG. 1). The path prediction module 306 may predict the path of a pedestrian based on data captured by the sensor 106. In embodiments, the path prediction module 306 may determine a position of a pedestrian at two or more different times and may predict a path of the pedestrian based on these determined positions. That is, the path prediction module 306 may determine a direction in which a pedestrian is headed and may predict a path for the pedestrian based on an assumption that the pedestrian will continue in the same direction. As the sensor 106 captures additional data, the path prediction module 306 may update the predicted path of the pedestrian based on the additional data.

After predicting a path of a pedestrian, the path prediction module 306 may determine whether the pedestrian is expected to intersect within a predetermined distance D of the hitch 18 or the tow ball 22 based on the predicted path. In some embodiments, the predetermined distance D is one foot, two feet, three feet, or four feet, ±10%, ±20%, ±30%, ±40%, or ±50%. When a pedestrian intersects within this predetermined distance D, the pedestrian may be in danger of colliding with the hitch 18 or the tow ball 22.

If the pedestrian is expected to intersect within the predetermined distance D of the hitch 18 or the tow ball 22, an alert may be issued, as explained in further detail below. If the pedestrian is not expected to intersect within the predetermined distance D of the hitch 18 or the tow ball 22, then there is no need to issue an alert. The path prediction module 306 may also determine a speed of a pedestrian identified by the pedestrian detection module 304 based on data captured by the vehicle sensors 210. As such, if the path prediction module 306 determines that a pedestrian is expected to intersect within the predetermined distance D of the hitch 18 or the tow ball 22, the path prediction module 306 may determine an expected time to intersection of the pedestrian within the predetermined distance D of the hitch 18 or the tow ball 22 based on the predicted path of the pedestrian and the detected speed of the pedestrian.

Referring still to FIG. 3, the alert generation module 308 may determine whether an alert should be issued and may issue such an alert when this determination is positive. In embodiments, the alert generation module 308 may determine that an alert should be issued if the tow hitch detection module 300 determines that the hitch 18 is connected to the hitch receiver 16, if the trailer detection module 302 determines that a trailer is not connected to the tow ball 22, if the pedestrian detection module 304 identifies a pedestrian, and if the path prediction module 306 determines that the pedestrian is expected to intersect within the predetermined distance D of the hitch 18 or the tow ball 22 within a predetermined threshold time.

The purpose of issuing an alert is to warn a pedestrian that they are about to walk into the hitch 18 or the tow ball 22. As such, if the tow hitch detection module 300 detects that the hitch 18 is not connected, then there is no need to issue a warning since the pedestrian cannot walk into the hitch 18 or the tow ball 22 when they are not connected. Furthermore, if the trailer detection module 302 detects that a trailer is connected to the tow ball 22, then there is no need to issue a warning since it is presumed that the pedestrian will easily see the trailer and avoid walking into the hitch 18.

In addition, an alert need only be issued if a pedestrian is detected who is predicted to walk into the hitch 18 or the tow ball 22. If a pedestrian is walking away from the hitch 18 or adjacent to the hitch 18, then the pedestrian is not in danger of walking into the hitch 18 and there is no need to issue an alert. Furthermore, if the expected time to intersection for an identified pedestrian is greater than a predetermined threshold (e.g., greater than 10 seconds), then there is no need to issue a warning. In this case, it is possible that the pedestrian will change course before colliding with the hitch 18. Furthermore, if an alert is issued too early (e.g., while the pedestrian is still relatively far from the hitch 18), it may be issued unnecessarily or it may not get the pedestrian's attention as to what the alert is for. In some examples, the alert generation module 308 generates an alert when the pedestrian is within a predetermined threshold distance from the hitch 18 rather than when the expected time to intersection is within a predetermined threshold time.

If the alert generation module 308 determines that an alert should be issued, based on the factors described above, then the alert generation module 308 may issue an audio and/or a visual alert to warn the pedestrian that they are about to collide with the hitch 18 or the tow ball 22. An audio alert may comprise causing the horn of the vehicle 10 to honk one or more times. Alternatively, an audio alert may comprise causing the external speakers 110 of the vehicle 10 to issue a warning. For example, the external speakers 110 may play a recording of a voice telling nearby pedestrians to be aware of nearby tow ball.

A visual alert may comprise causing one or more lights of the vehicle 10 to blink or flash one or more times. For example, the external lights 108 of the vehicle 10 may flash, lights on the license plate of the vehicle 10 may flash, or other external lights on the vehicle 10 may flash. In some examples, the alert generation module 308 may cause a combination of audio and/or visual alerts to be issued. The audio and visual alerts may warn a pedestrian that they are approaching the hitch 18 or the tow ball 22 and may prevent them from walking into the hitch 18 or the tow ball 22, which may prevent injury to the pedestrian.

In embodiments, when the alert generation module 308 issues an audio or visual alert to a pedestrian, the alert generation module 308 may also cause the display unit 208 inside the vehicle 10 to display an indication that an alert is being issued to warn a nearby pedestrian about the hitch 18. This may prevent vehicle occupants from being surprised that the vehicle 10 is suddenly honking its horn, flashing its lights, or otherwise warning the pedestrian.

Figure 4:
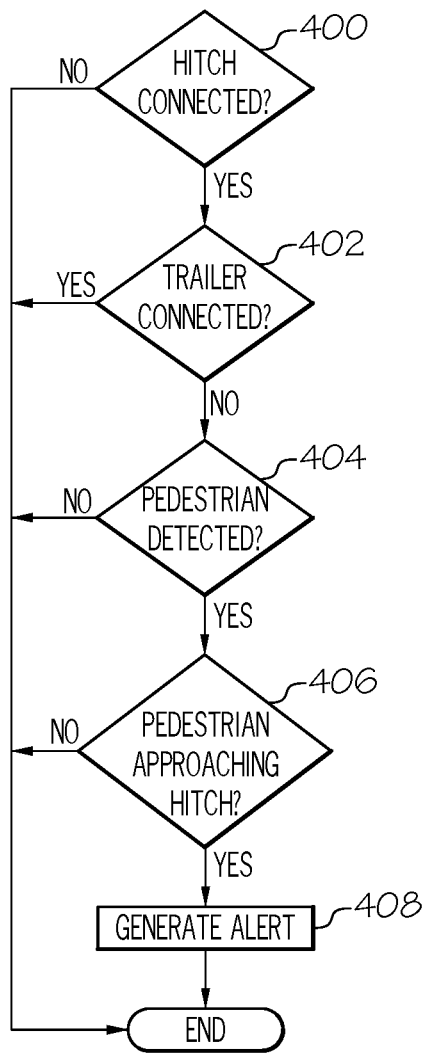
FIG. 4 depicts a flowchart of a method for operating the hitch cross path alert system of FIGS. 2-3, according to one or more embodiments shown and described herein.

FIG. 4 depicts a flowchart of an example method for operating the example hitch cross path alert system 200, according to one or more embodiments shown and described herein. At step 400, tow hitch detection module 300 determines whether the hitch 18 is connected to the hitch receiver 16. If the tow hitch detection module 300 determines that the hitch 18 is connected to the hitch receiver 16 (yes at step 400), then control passes to step 402. Otherwise (no at step 400), the method of FIG. 4 ends.

At step 402, the trailer detection module 302 determines whether a trailer is connected to the tow ball 22. If the trailer detection module 302 determines that a trailer is not connected to the tow ball 22 (no at step 402), then control passes to step 404. Otherwise (yes at step 402), the method of FIG. 4 ends.

At step 404, the pedestrian detection module 304 determines whether a pedestrian is detected near the vehicle 10. If the pedestrian detection module 304 determines that a pedestrian is detected (yes at step 404), then control passes to step 406. Otherwise (no at step 404), the method of FIG. 4 ends.

At step 406, the path prediction module 306 predicts a path of the pedestrian detected by the pedestrian detection module 304, determines a speed of the pedestrian, and determines whether the pedestrian is expected to intersect within the predetermined distance D of the hitch 18 or the tow ball 22 within a predetermined threshold time. If the path prediction module 306 determines that the pedestrian is expected to intersect within the predetermined distance D of the hitch 18 or the tow ball 22 within a predetermined threshold time (yes at step 406), then at step 408, the alert generation module 308 generates an audio and/or visual alert. Otherwise (no at step 406), the method of FIG. 4 ends.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A hitch cross path alert system for a vehicle comprising:
    a first sensor to detect whether a hitch is connected to a hitch receiver connected to the vehicle;
    a second sensor to identify a pedestrian in proximity to the vehicle; and
    a processor configured to predict a path of the pedestrian based on data captured by the second sensor and to cause the vehicle to output an audio or visual warning to the pedestrian when it is determined that the predicted path of the pedestrian intersects within a predetermined distance of the hitch.

2. The hitch cross path alert system of claim 1, wherein:
    the processor is configured to determine a speed of the pedestrian; and
    the processor is configured to determine a time to intersection of the pedestrian within the predetermined distance of the hitch based on the predicted path of the pedestrian and the speed of the pedestrian.

3. The hitch cross path alert system of claim 2, wherein the processor is configured to cause the vehicle to output the audio or visual warning when the processor determines that the time to intersection is less than a predetermined threshold time.

4. The hitch cross path alert system of claim 1, wherein the processor is configured to cause the vehicle to output the audio or visual warning when the processor determines that the pedestrian is within a predetermined threshold distance from the hitch.

5. The hitch cross path alert system of claim 1, further comprising:
    a third sensor to detect whether a trailer is connected to the hitch;
    wherein the processor is configured to cause the vehicle to output the audio or visual warning when:
        the first sensor detects that the hitch is connected to the hitch receiver;
        the second sensor identifies the pedestrian;
        the third sensor detects that the trailer is connected to the hitch; and
        the processor determines that the predicted path of the pedestrian intersects within a predetermined distance of the hitch.

6. The hitch cross path alert system of claim 5, wherein the third sensor comprises a rear-facing camera attached to the vehicle.

7. The hitch cross path alert system of claim 1, wherein the first sensor comprises a rear-facing camera attached to the vehicle.

8. The hitch cross path alert system of claim 1, wherein the second sensor comprises a rear-facing camera or a RADAR attached to the vehicle and a classifier.

9. The hitch cross path alert system of claim 1, wherein the audio warning is output by one or more external speakers attached to the vehicle.

10. The hitch cross path alert system of claim 1, wherein the visual warning comprises causing one or more external lights of the vehicle to flash.

11. The hitch cross path alert system of claim 1, wherein the processor is configured to cause a display inside the vehicle to indicate the presence of the pedestrian upon causing the vehicle to output the audio or visual warning.

12. The hitch cross path alert system of claim 1, wherein the processor is configured to cause the vehicle to output the audio or visual warning only when the first sensor detects that the hitch is connected to the hitch receiver.

13. A hitch cross path alert system for a vehicle comprising:
- a first sensor to detect whether a hitch is connected to a hitch receiver connected to the vehicle;
- a second sensor to identify a pedestrian in proximity to the vehicle;
- a third sensor to detect whether a trailer is connected to the hitch; and
- a processor configured to predict a path of the pedestrian based on data captured by the second sensor and to cause the vehicle to output an audio or visual warning to the pedestrian when:
  - the first sensor detects that the hitch is connected to the hitch receiver;
  - the second sensor identifies the pedestrian;
  - the third sensor detects that the trailer is connected to the hitch; and
  - the processor determines that the predicted path of the pedestrian intersects within a predetermined distance of the hitch.

14. The hitch cross path alert system of claim 13, wherein the processor is configured to cause the vehicle to output the audio or visual warning when the processor determines that the pedestrian is within a predetermined threshold distance from the hitch.

15. The hitch cross path alert system of claim 13, wherein the first sensor comprises a rear-facing camera attached to the vehicle.

16. The hitch cross path alert system of claim 13, wherein the second sensor comprises a rear-facing camera or a RADAR attached to the vehicle and a classifier.

17. The hitch cross path alert system of claim 13, wherein the third sensor comprises a rear-facing camera attached to the vehicle.

18. The hitch cross path alert system of claim 13, wherein the audio warning is output by one or more external speakers attached to the vehicle.

19. The hitch cross path alert system of claim 13, wherein the visual warning comprises causing one or more external lights of the vehicle to flash.

20. The hitch cross path alert system of claim 13, wherein the processor is configured to cause a display inside the vehicle to indicate the presence of the pedestrian upon causing the vehicle to output the audio or visual warning.

* * * * *